United States Patent
Gatling

[19]

[11] Patent Number: 5,927,575
[45] Date of Patent: Jul. 27, 1999

[54] SPORTSMAN'S CUSHION AND BACKPACK

[76] Inventor: William D. Gatling, 3545 Wesley Dr., Waycross, Ga. 31503

[21] Appl. No.: 09/112,309

[22] Filed: Jul. 9, 1998

[51] Int. Cl.[6] ........................................... A45F 4/02
[52] U.S. Cl. ........................ 224/153; 224/155; 224/580; 224/582; 224/583; 224/584; 224/600; 224/642
[58] Field of Search .................................. 224/153, 155, 224/579, 580, 582, 583, 584, 586, 600, 627, 637, 638, 639, 642, 644, 646; 190/8, 12 A; 383/4; 297/219.1, 219.12, 228.12, 250.1

[56] References Cited

U.S. PATENT DOCUMENTS

| | | | |
|---|---|---|---|
| 2,782,839 | 2/1957 | Cole | 297/228.12 |
| 4,190,918 | 3/1980 | Harvell | 5/653 |
| 4,236,657 | 12/1980 | Brunton | 224/153 |
| 4,863,003 | 9/1989 | Carter | 190/8 |
| 5,275,315 | 1/1994 | Carmack et al. | 224/151 |
| 5,477,998 | 12/1995 | Reckler | 224/586 |
| 5,586,703 | 12/1996 | Radar et al. | 224/601 |
| 5,588,570 | 12/1996 | Zirbel | 224/155 |
| 5,785,427 | 7/1998 | Godshaw | 383/4 |
| 5,799,851 | 9/1998 | Wulf et al. | 224/583 |

*Primary Examiner*—Allan N. Shoap
*Assistant Examiner*—Maerena W. Brevard
*Attorney, Agent, or Firm*—Brian D. Bellamy

[57] ABSTRACT

The invention provides a cushion and backpack combination including a back support cushion and seat support cushion that are connected by a pair of shoulder straps. Both the back cushion and seat cushion include additional straps for securing the cushions to an object. The back cushion includes integrated pockets, and the seat cushion has detachably appended packs on each side. The appended packs are folded over onto the seat cushion and then tied onto the seat cushion using the securing straps to form a single backpack unit. By placing the carrying straps over each shoulder, the sportsman may carry both the cushions and the packs.

5 Claims, 5 Drawing Sheets

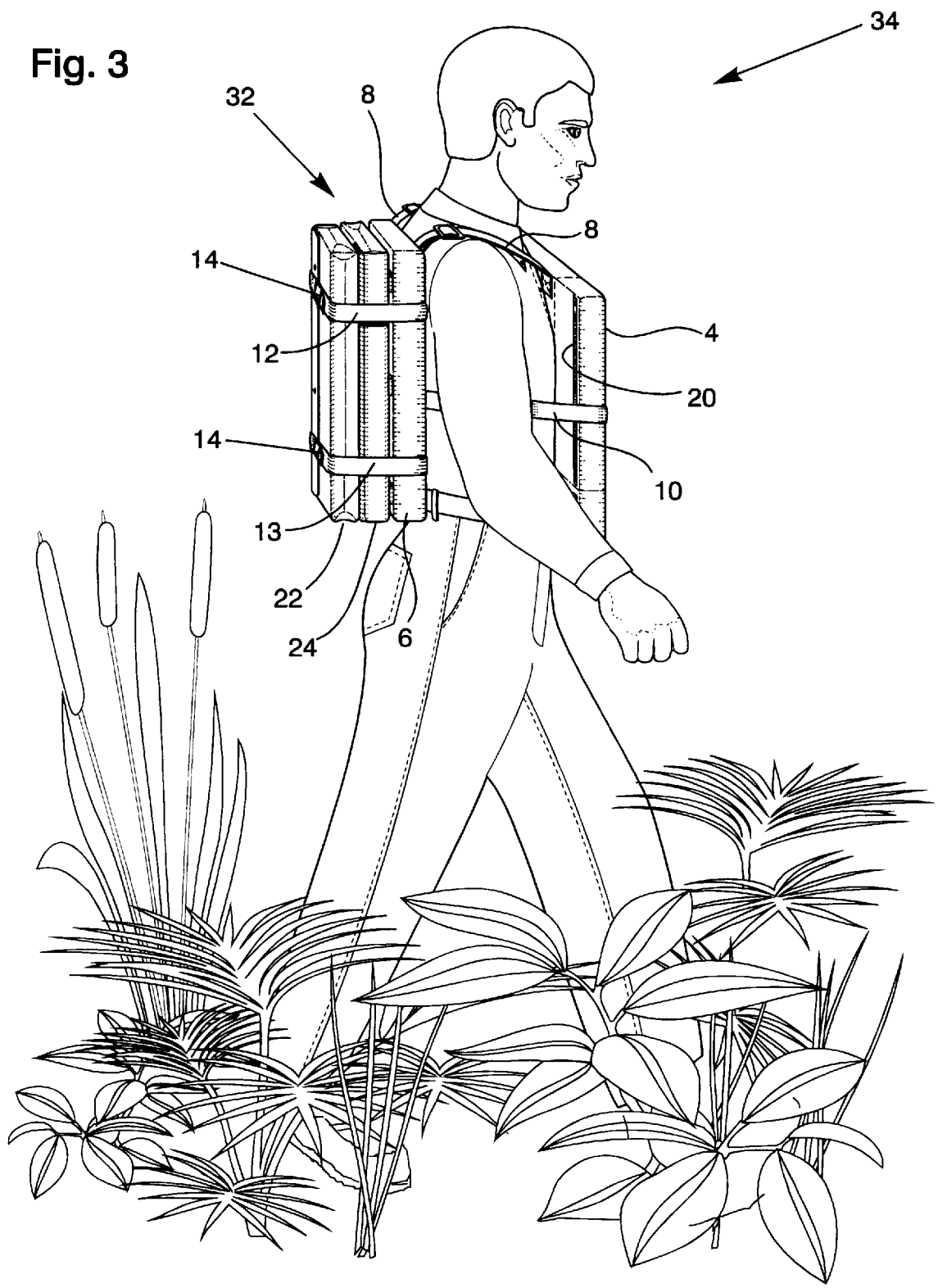

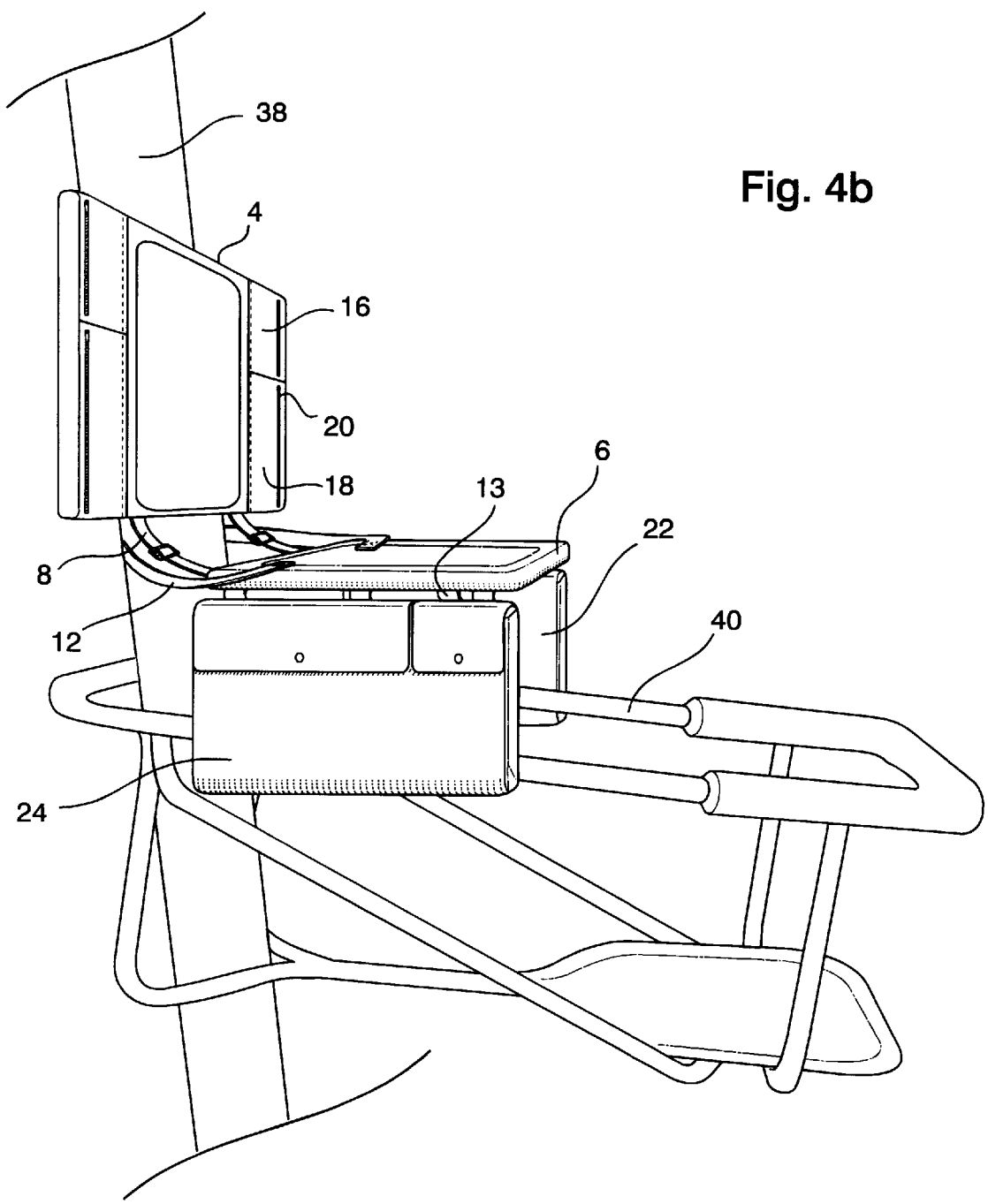

SPORTSMAN'S CUSHION AND BACKPACK

INTRODUCTION

The present application relates to a cushion for supporting a hunter's back and buttocks and a supply pouch for carrying hunting supplies, and more particularly to a cushion and supply pouch combination adapted for convenient carriage as a backpack and further adapted for convenient use as a seat cushion in hunter's tree stands, and the like as needed by persons while hunting.

BACKGROUND OF THE INVENTION

Sportsmen, including hunters, carry many supplies while hunting including such items as a rifle, shotgun, bow, ammunition, bug spray, flashlight, game scents and calls, gloves, extra clothing, food, blanket, etc. Further, sportsmen often desire to carry a cushion to use when resting or when sitting on a stand or against a tree. Therefore, portable cushions and carrying packs are often used in the field by sportsmen to improve the comfort and convenience of the hunting experience. When desiring to include all of the items needed for a comfortable hunting experience, sportsmen often find themselves burdened by the chore of carrying the assortment of items. Often, sportsmen will carry a large backpack to store the needed equipment. However, these known backpacks are not adapted for convenient use in hunting stands in combination with a cushion device.

A combination cushion and carrying assembly is shown in U.S. Pat. No. 4,190,918. From a review of this patent, it is seen that the carrying assembly is carried by hand and the cushion device is adapted for use in stadium type seats. For hunting it is desirable to carry the pack on one's back to free up the hands for carrying armaments, game, and other items unable to fit into a pack. Further, combination cushion and packing devices like that in U.S. Pat. No. 4,190,918 have not met the need for a cushion and pack that is versatile enough to be conveniently used in locations such as various types of hunting stands. There exists a need for such a device in that sportsmen will sometimes suffer back injury and discomfort from sitting in stands and trees without cushioning and also by trying to access a backpack that is required to be kept remote from the location of a hunter in a stand or tree.

SUMMARY OF INVENTION

The present invention provides a cushion and backpack combination for use by sportsmen when hunting that includes a back cushion and seat cushion that are connected by a pair of shoulder straps. Both the back cushion and seat cushion include additional straps for securing the cushions to a stand, tree, or similar structure. The back cushion includes integrated zip pockets or pouches on each side, and the seat cushion has detachably appended packs on each side. The invention is arranged as a backpack for carrying by folding the appended packs over onto the seat cushion and then tieing the packs onto the seat cushion using the securing straps to form a single backpack unit. By placing the carrying straps over each shoulder, the sportsman may conveniently carry both the cushions and the packs.

Accordingly, one object of the present invention is to provide a combination cushion and carrying pack for use by sportsmen, including hunters. Another object of the invention is to provide a seat and back cushion for use by sportsmen while sitting in stands and trees. A further object is to provide such a construction of the combination cushions and packs that the apparatus may be conveniently carried as a compact backpack unit. Yet another object is to provide convenient storage and access for items needed by a sportsman while sitting in a stand or the like. These and other objects and advantages of the present invention will become apparent to those persons skilled in the art from a study of the drawings and from a review of the following detailed description of a preferred embodiment of the invention.

BRIEF DESCRIPTION OF THE DRAWINGS

The invention will be further described in connection with the accompanying drawings, in which:

FIG. 3 is a perspective view of the cushion and backpack combination of the present invention in a folded condition as carried over the shoulders of a sportsman.

FIG. 4B is a perspective view of the present invention illustrating its use as a seat and backrest in a tree climber stand.

DETAILED DESCRIPTION

Figure 1:
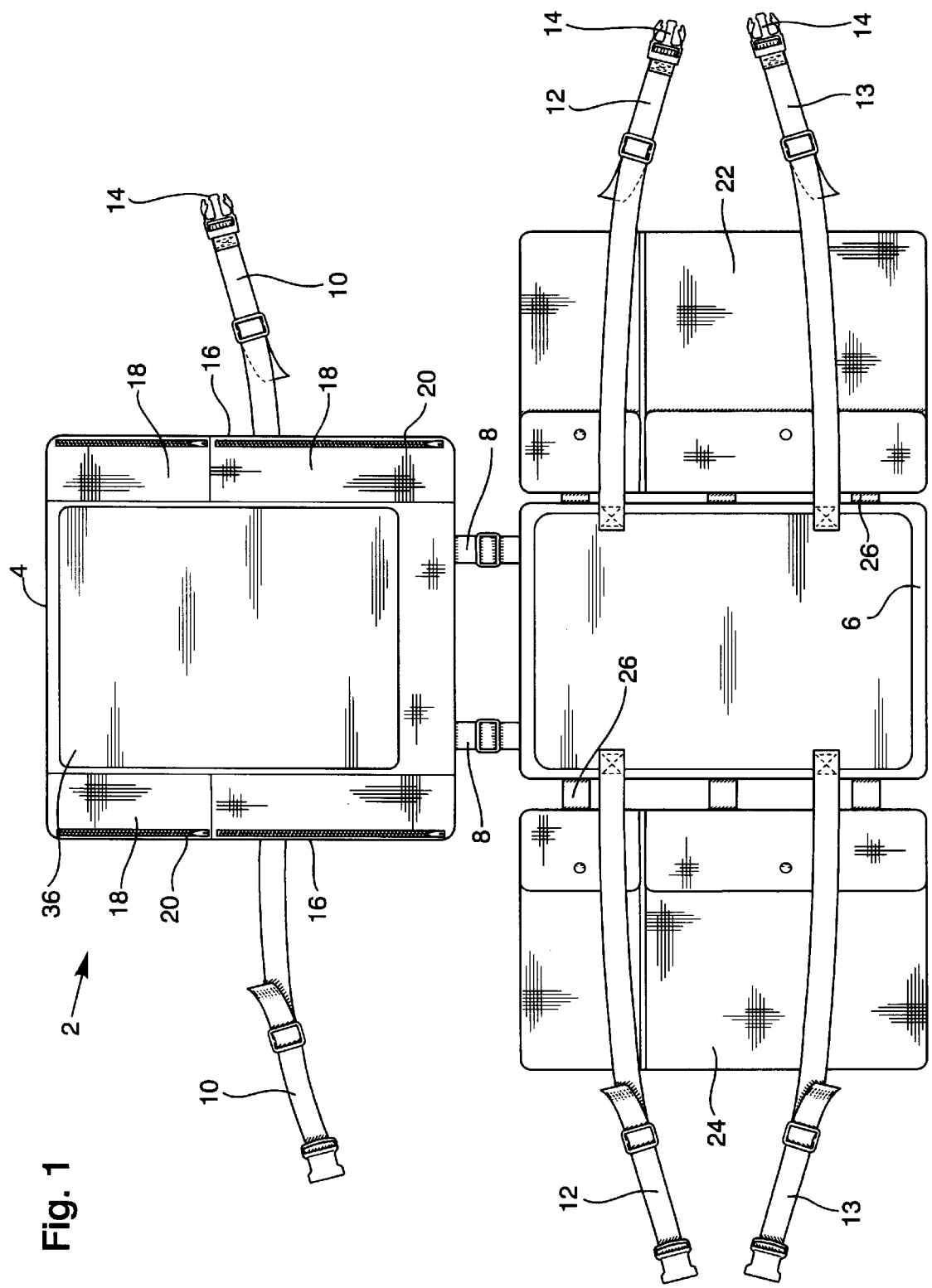
FIG. 1 is a plan view of the front side of the cushion and backpack combination of the present invention in an extended position.

Referring to FIG. 1, a preferred embodiment of the invention is shown. A cushion and backpack combination 2 is shown having a back support cushion 4 and a seat support cushion 6. Each of the cushions comprise a filling of foam or other suitably soft and supportive material contained within a shell of canvass or other suitable covering material of fabric or suitable material. The outer shell may include a camouflage design especially suited for hunting. The back support cushion 4 and seat support cushion 6 are connected together by shoulder strap means such as the shoulder straps 8 shown in FIG. 1. The shoulder straps 8 are of sufficient length to permit placement of the shoulder straps over a person's head for carrying the cushions 4 and 6. Alternatively, the shoulder straps 8 may be made adjustable in length. Each cushion 4 and 6 has attached thereto additional securing means. A first securing means is comprised of a first strap 10 attached to the back support cushion 4, and a second securing means is comprised second securing strap 12 and third securing strap 13 attached to the seat support cushion 6. The first and second securing means are used for securing the cushions 4 and 6 to the location where a person will sit. Snap buckles 14 or similar connecting device can be used on the first, second, and third securing straps 10, 12, and 13 for connecting and tightening the straps to an object.

Figure 2:
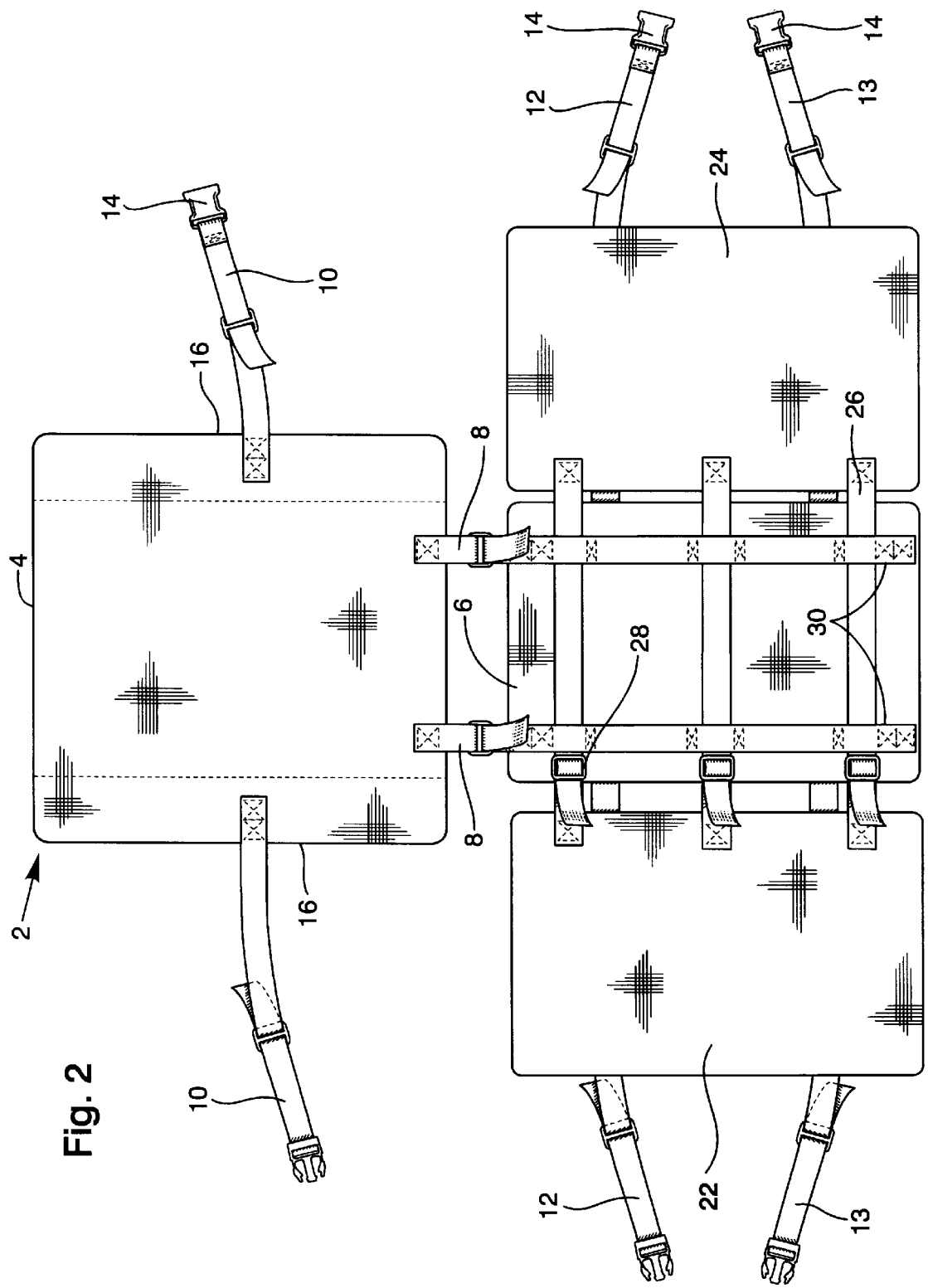
FIG. 2 is a plan view of the back side of the present invention in an extended position.

The cushion and backpack combination 2 of the present invention includes a plurality storage pockets 16 on the back support cushion 4. These storage pockets 16 may be integrated into the back support cushion 4 and may include several compartments 18 as well as include zippers, snaps, buttons, Velcro, or similar means 20 for opening and closing the pockets. The combination 2 further includes one or more removable packs. As illustrated in FIGS. 1 and 2, a first pack 22 and a second pack 24 are attached on each side of the seat support cushion 6. In the embodiment of the invention shown in FIGS. 1 and 2, the removable packs 22 and 24 are attached by strap links 26 having a snap buckle 28 or the like between the links and the second pack 24 to permit detachment of the packs 22 and 24 from the seat support cushion 6. In this preferred embodiment, the strap links 26 are held onto the seat support cushion 6 by cross straps 30. Other various means including snaps and Velcro may be used for attaching the packs 22 and 24 individually such that they may be removed from the seat support cushion 6, thereby accomplishing the desired objectives. The strap links 26 provide a convenient means for attaching the removable packs 22 and 24 while allowing the removable packs to be easily folded onto the top of the seat support cushion 6 for use as a backpack as shown in FIG. 3.

In order to convert the cushion and backpack combination 2 into a backpack, removable packs 22 and 24 are folded onto the seat support cushion 6 to form a single combined unit 32 that is strapped tightly together using the second means, second and third straps 12 and 13. Using the shoulder straps 8 to support the cushion and backpack combination 2 on his shoulders, the sportsman 34 rests the combined unit 32 on his back while the back support cushion 4 with integrated pockets 16 rests on the sportsman's chest. The first securing means, first strap 10, may be wrapped around the sportsman's waist to secure the cushion and backpack combination 2 to his body for carrying. Further, the exposed side of the back support cushion 4 may be covered with a bright colored reflective material 36 for safety while walking through underbrush near other hunters carrying armaments. Likewise, the exposed side of the combined unit 32 may be provided bright colored reflective material as an additional safety feature.

Figure 4A:
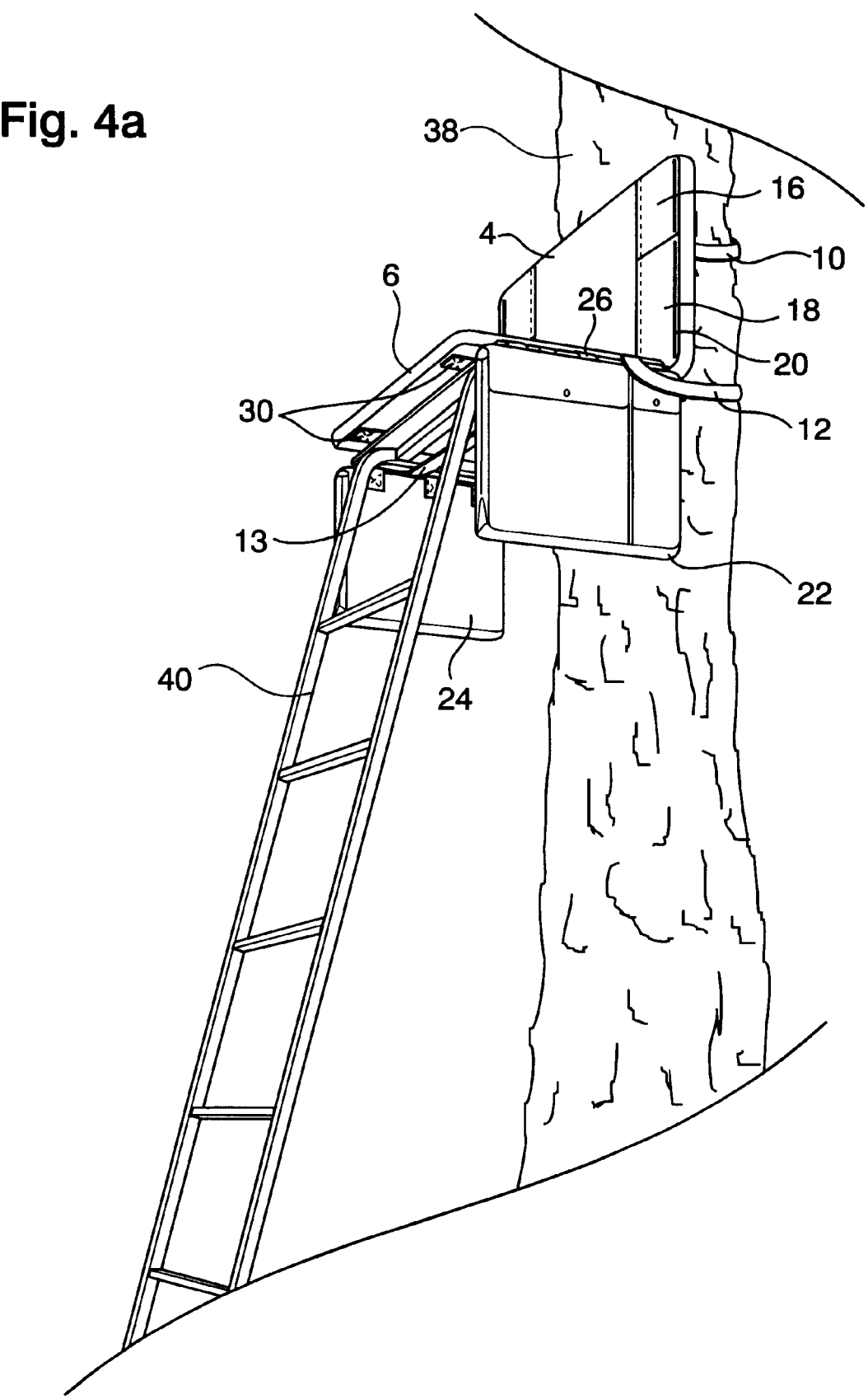
FIG. 4A is a perspective view of the present invention illustrating its use as a seat and backrest in a ladder type tree stand.

In use as a cushion and seat, the cushion and backpack combination 2 is shown in FIGS. 4A and 4B. In each Figure a stand 40 is shown each being of a different variety. In FIG. 4A, the stand 40 is a ladder type tree stand like that hunters often use in hunting deer. In FIG. 4B, the stand 40 is a climber type tree stand also commonly used by hunters. The present invention is especially adapted to be used on any of the known type of hunting stands. The detachable packs 22 and 24 may be removed from the seat cushion 6 so that the packs and straps do not interfere with securing the cushion 6 on a particular stand.

In FIGS. 4A and 4B the invention is disposed on a tree trunk 38 and the stand 40. Thereby, the back support cushion 4 is placed in a vertical upright position against the tree trunk 38 by wrapping the first securing means, first strap 10, about the tree trunk and tightening. Further, the seat support cushion 6 is placed in a horizontal flat position on the stand 40, and the seat support cushion 6 is secured to the stand 40 by wrapping the second securing means, second and third straps 12 and 13, about the stand 40 and tightening. It is an important aspect of this invention that the removable packs 22 and 24 are readily accessible by the user when sitting on the cushion and seat arrangement shown in FIG. 4. Consequently, the sportsman 34 may pack his or her gear into the integrated pockets 16 and the removable packs 22 and 24 before beginning his or her outing, and he or she will be able to conveniently carry the gear along with cushions and armaments for hunting without the task becoming a burdensome chore.

It is appreciated from the foregoing specification that the present invention entails a generally simple and relatively inexpensive cushion and backpack combination 2 that not only serves as a cushion when used as suggested in FIG. 4, but has the added utility of being designed to convert to a backpack to carry gear and supplies that are often desired and needed in conjunction with a hunting excursion in which a cushioned seat and backrest may be desired. Therefore, the present invention serves a multipurpose and is particularly adapted and suitable for use by the sportsman or hunter that sits in hunting stands or the like while hunting, or rests against a tree while hiking, or any similar type of situation in which a cushion and a backpack would be desired.

While preferred embodiments of the invention have been shown and described, those skilled in this art will recognize that various modifications may be made in these embodiments without departing from the spirit and scope of the present invention. Therefore, the scope of the present invention is set forth in the claims that follow.

What is claimed is:

1. A combination cushion and backpack apparatus comprising:

a back support cushion;

a seat support cushion;

a shoulder strap means for connecting the back support cushion and seat support cushion such that the apparatus may be carried over a person's shoulders;

a plurality of pockets for storage of supplies attached to the back support cushion;

one or more packs for storage of supplies attached to each side of the seat support cushion;

a first securing means attached to the back support cushion for securing the back support cushion to an object or person;

a second securing means attached to the seat support cushion for securing the seat support cushion to an object or for securing the packs to the seat support cushion.

2. A combination cushion and backpack apparatus as claimed in claim 1 that includes a brightly colored reflective material on said back support cushion and said seat support cushion.

3. A combination cushion and backpack apparatus as claimed in claim 1 in which said packs are detachable from the seat support cushion.

4. A combination cushion and backpack apparatus as claimed in claim 1 in which said shoulder strap means includes a pair of straps that are adjustable in length.

5. A combination cushion and backpack apparatus as claimed in claim 1 in which said first securing means includes a first strap attached to said back support cushion and having a means for connecting the ends of the first strap such that the first strap may be tightened about an object; said second securing means includes a second strap attached to said seat support cushion and having a means for connecting the ends of the second strap such that the second strap may be tightened about an object; said second securing means further including a third strap attached to said seat support cushion and having a means for connecting the ends of the third strap such that the third strap may be tightened about an object.

* * * * *